(12) United States Patent
Bhojan

(10) Patent No.: US 10,055,339 B2
(45) Date of Patent: Aug. 21, 2018

(54) METHODS AND SYSTEMS FOR TESTING MOBILE APPLICATIONS

(71) Applicant: Wipro Limited, Bangalore (IN)

(72) Inventor: Rajkumar Joghee Bhojan, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/354,741

(22) Filed: Nov. 17, 2016

(65) Prior Publication Data

US 2018/0089068 A1  Mar. 29, 2018

(30) Foreign Application Priority Data

Sep. 28, 2016 (IN) .............................. 201641033196

(51) Int. Cl.
  *G06F 9/44* (2018.01)
  *G06F 11/36* (2006.01)
  *G06F 8/61* (2018.01)
  *H04W 4/50* (2018.01)

(52) U.S. Cl.
  CPC ............ *G06F 11/3684* (2013.01); *G06F 8/61* (2013.01); *G06F 11/3688* (2013.01); *H04W 4/50* (2018.02)

(58) Field of Classification Search
  None
  See application file for complete search history.

(56) References Cited

U.S. PATENT DOCUMENTS

| | | | |
|---|---|---|---|
| 7,685,468 B2 | 3/2010 | Copstein et al. | |
| 8,856,748 B1 | 10/2014 | Larsen et al. | |
| 9,116,767 B1 * | 8/2015 | Arif | ............................ G06F 8/60 |
| 9,152,542 B2 | 10/2015 | Navalur | |
| 9,262,404 B2 | 2/2016 | Ingram et al. | |
| 9,329,982 B2 * | 5/2016 | Arif | ........................... G06F 8/60 |

(Continued)

FOREIGN PATENT DOCUMENTS

EP     2615555 A1    7/2013

OTHER PUBLICATIONS

Hamdy, Abeer, Osman Ibrahim, and Ahmed Hazem. "A Web Based Framework for Pre-release Testing of Mobile Applications." MATEC Web of Conferences. vol. 76. EDP Sciences, 2016. (Year: 2016).*

(Continued)

*Primary Examiner* — Matthew J Brophy
(74) *Attorney, Agent, or Firm* — LeClairRyan PLLC

(57) ABSTRACT

A method, device, and non-transitory computer readable medium for testing mobile applications in a mobile application testing system is disclosed. The method includes creating at least one Docker container in the mobile application testing system. After creating the at least one docker container, the method identifies a mobile application for testing. The method automatically generates at least one test artifact in response to identifying the mobile application for testing. Thereafter, the method installs the at least one test artifact for the mobile application for testing in the at least one Docker container. Further, the method selects at least one mobile device in response to installing the at least one test artifact for the mobile application for testing in the at least one Docker container. Thereafter, the method executes the at least one test artifact for the at least one selected mobile device in the at least one Docker container.

19 Claims, 10 Drawing Sheets

(56) References Cited

U.S. PATENT DOCUMENTS

| | | | | |
|---|---|---|---|---|
| 9,436,585 B1* | 9/2016 | Bak | | G06F 8/71 |
| 9,584,440 B1* | 2/2017 | Blakely | | H04L 67/22 |
| 9,817,746 B2* | 11/2017 | Li | | G06F 11/3664 |
| 9,826,045 B2* | 11/2017 | Straub | | H04L 67/141 |
| 9,842,045 B2* | 12/2017 | Heorhiadi | | G06F 11/3692 |
| 9,898,397 B2* | 2/2018 | Arif | | G06F 11/3688 |
| 9,916,233 B1* | 3/2018 | Qureshi | | G06F 11/3692 |
| 2010/0083228 A1* | 4/2010 | Branda | | G06F 11/3466 |
| | | | | 717/120 |
| 2013/0097706 A1* | 4/2013 | Titonis | | G06F 21/56 |
| | | | | 726/24 |
| 2014/0210968 A1* | 7/2014 | Kauniskangas | | H04N 1/00323 |
| | | | | 348/61 |
| 2014/0247340 A1* | 9/2014 | Kauniskangas | | G06Q 50/22 |
| | | | | 348/92 |
| 2014/0250205 A1* | 9/2014 | Kauniskangas | | H04L 69/03 |
| | | | | 709/217 |
| 2015/0317240 A1* | 11/2015 | Li | | G06F 11/3612 |
| | | | | 714/38.1 |
| 2015/0356002 A1* | 12/2015 | Arif | | G06F 8/60 |
| | | | | 714/38.1 |
| 2016/0034809 A1* | 2/2016 | Trenholm | | H04L 41/5041 |
| | | | | 706/20 |
| 2016/0062879 A1 | 3/2016 | Tan et al. | | |
| 2016/0092339 A1* | 3/2016 | Straub | | G06F 9/44521 |
| | | | | 717/124 |
| 2016/0092348 A1* | 3/2016 | Straub | | G06F 11/3684 |
| | | | | 717/124 |
| 2016/0202962 A1* | 7/2016 | Arif | | G06F 8/60 |
| | | | | 717/174 |
| 2016/0306981 A1* | 10/2016 | Hoog | | G06F 21/577 |
| 2016/0330138 A1* | 11/2016 | Thomason | | H04L 67/10 |
| 2017/0034023 A1* | 2/2017 | Nickolov | | H04L 43/0817 |
| 2017/0139816 A1* | 5/2017 | Sapozhnikov | | G06F 11/3672 |
| 2017/0147320 A1* | 5/2017 | Persson | | G06F 8/65 |
| 2017/0185931 A1* | 6/2017 | Bhojan | | G06Q 10/06313 |
| 2017/0242784 A1* | 8/2017 | Heorhiadi | | G06F 11/3692 |
| 2017/0264684 A1* | 9/2017 | Spillane | | H04L 67/1095 |
| 2017/0269921 A1* | 9/2017 | Martin Vicente | | G06F 11/3668 |
| 2017/0277521 A1* | 9/2017 | Sharma | | G06F 9/4498 |
| 2017/0277560 A1* | 9/2017 | Lucas | | G06F 9/4498 |
| 2017/0277800 A1* | 9/2017 | Lucas | | G06F 9/4498 |
| 2017/0344354 A1* | 11/2017 | Schiefelbein | | G06F 8/61 |
| 2018/0089068 A1* | 3/2018 | Bhojan | | G06F 11/3684 |
| 2018/0089437 A1* | 3/2018 | Baset | | G06F 21/577 |

OTHER PUBLICATIONS

Boussaa, Mohamed, et al. "Automatic non-functional testing of code generators families." ACM SIGPLAN Notices. vol. 52. No. 3. ACM, 2016. (Year: 2016).*

* cited by examiner

METHODS AND SYSTEMS FOR TESTING MOBILE APPLICATIONS

This application claims the benefit of Indian Patent Application Serial No. 201641033196 filed Sep. 28, 2016 which is hereby incorporated by reference in its entirety.

FIELD

The disclosure relates generally to mobile applications and more particularly to methods and systems for testing mobile applications.

BACKGROUND

Mobile device manufacturers develop mobile devices with various operating systems and/or various versions of the same operating systems. This has led to flooding of the market with different kinds of mobile devices, manufactured by different vendors, and with different software features and hardware components. Mobile applications, while running on different devices, may behave differently due to variations in the hardware or operating system components. Testing a mobile application typically involves monitoring, troubleshooting, verification, and validation of hardware and software components of the mobile devices on which the mobile application is run.

Moreover, mobile application test execution often takes a long time to complete because the tests are executed in different environments, thereby causing the application developers to create complex tear down procedures. Such tear down procedures are lengthy and often lead to unpredictable failures, thereby leading to lack of trust in such tests and consequently undermining the entire test automation effort. Thus, multiple quality assurance efforts are undertaken which results in a time-consuming and costly development process.

SUMMARY

In one embodiment, a method for testing mobile applications in a mobile application testing system is disclosed. The method includes creating, by a mobile application testing module, at least one Docker container in the mobile application testing system; identifying, by the mobile application testing module, a mobile application for testing; automatically generating, by the mobile application testing module; at least one test artifact in response to identifying the mobile application for testing; installing, by the mobile application testing module, the at least one test artifact for the mobile application for testing in the at least one Docker container; selecting, by the mobile application testing module, at least one mobile device in response to installing the at least one test artifact for the mobile application for testing in the at least one Docker container; and executing, by the mobile application testing module, the at least one test artifact for the at least one selected mobile device in the at least one Docker container.

In another embodiment mobile application testing system for testing mobile applications is disclosed. The mobile application testing system includes a user interface; a database; and a mobile application testing module operatively coupled to the user interface and the database. The mobile application testing module is configured to create at least one Docker container in the mobile application testing system; identify a mobile application for testing; automatically generate at least one test artifact in response to identifying the mobile application for testing; install the at least one test artifact for the mobile application for testing in the at least one Docker container; select at least one mobile device in response to installing the at least one test artifact for the mobile application for testing in the at least one Docker container; and execute the at least one test artifact for the at least one selected mobile device in the at least one Docker container.

In yet another embodiment, a computer-usable medium is disclosed, the computer-usable medium having non-transitory computer readable instructions stored thereon for execution by a mobile application testing module in a mobile application testing system to perform a method for creating at least one Docker container in the mobile application testing system; identifying a mobile application for testing; automatically generating least one test artifact in response to identifying the mobile application for testing; installing the at least one test artifact for the mobile application for testing in the at least one Docker container; selecting at least one mobile device in response to installing the at least one test artifact for the mobile application for testing in the at least one Docker container; and executing the at least one test artifact for the at least one selected mobile device in the at least one Docker container.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Various embodiments of the invention provide methods, systems, and computer program products for testing mobile applications in a mobile application testing system. The method includes creating, by a mobile application testing module, at least one Docker container in the mobile application testing system. After creating the at least one Docker container, the method identifies a mobile application for testing. The method automatically generates at least one test artifact in response to identifying the mobile application for testing. Thereafter, the method installs the at least one test artifact for the mobile application for testing in the at least one Docker container. Further, the method selects at least one mobile device in response to installing the at least one test artifact for the mobile application for testing in the at least one Docker container. Thereafter, the method executes the at least one test artifact for the at least one selected mobile device in the at least one Docker container.

Figure 1:
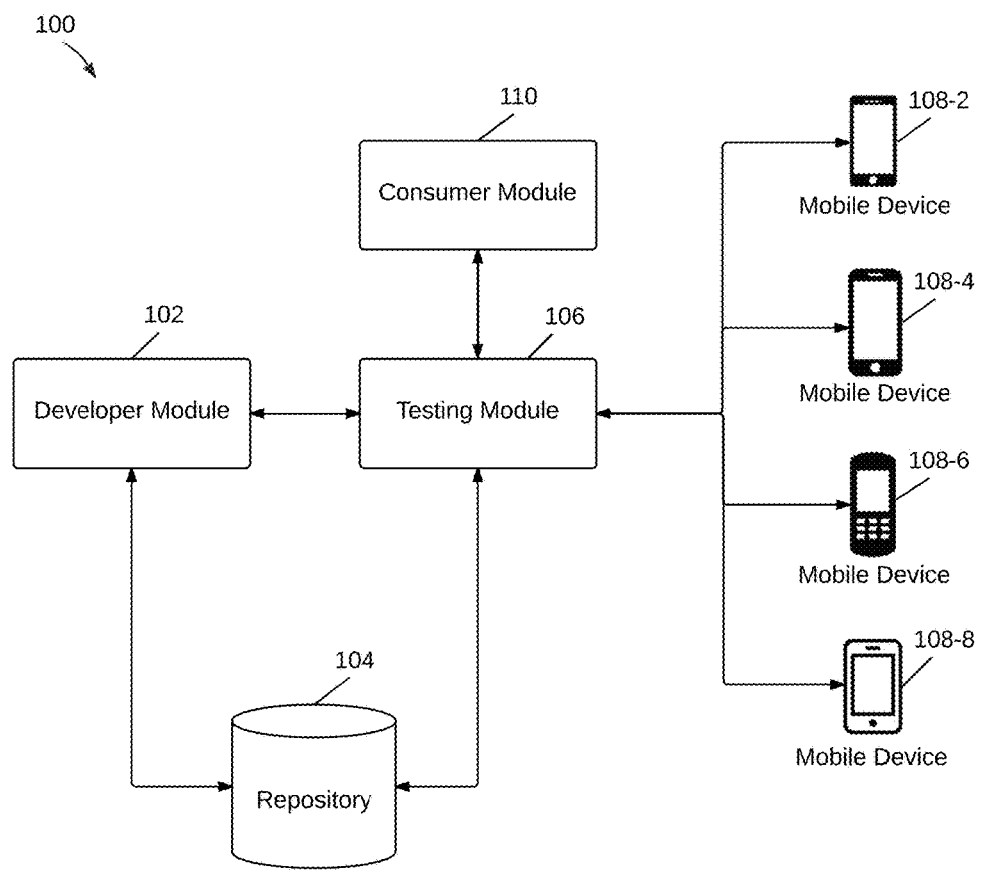
FIG. 1 is a system diagram of a mobile application testing environment (that is exemplary) in which various embodiments may be employed.

FIG. 1 is a system diagram of a mobile application testing environment 100 in which various embodiments may be employed. Mobile application testing environment 100 includes a developer module 102, a repository 104, a testing module 106, a plurality of mobile devices 108-n, and a consumer module 110. Plurality of mobile devices 108-n may correspond to mobile devices manufactured by different vendors. For example, mobile device 108-2 may be manufactured by a first vendor, mobile device 108-4 may be manufactured by a second vendor and mobile device 108-6 and 108-8 may be manufactured by a third vendor.

A developer/user may employ mobile application testing environment 100 to create, test, and deploy various mobile applications. Source code and other associated software for a mobile application may be created by the developer using developer module 102. Once the source code is written and the corresponding mobile application is created, the developer may commit the source code build to repository 104. Thereafter, the developer may transfer the source code build corresponding to the mobile application being developed to testing module 106. Once the source code build is received in testing module 106, data corresponding to plurality of mobile devices 108-n is retrieved by testing module 106. The data may correspond to hardware used in plurality of mobile devices 108-n, and firmware and software loaded on to plurality of mobile devices 108-n.

Thereafter, the source code build is subjected to various testing solutions in testing module 106 for each type of mobile device of plurality of mobile devices 108-n in order to validate the mobile application being developed. For example, the mobile application being developed may be subjected to regression testing in testing module 106 to check for errors and validation for each type of the mobile device of plurality of mobile devices 108-n. After running the various testing solutions, the output of the tests is sent back to developer module 102 in order for the developer to review and further analyze the mobile application being developed. Additionally, the output of the tests may also be stored in repository 104 for archival process.

Based on the output of the tests, the developer may decide to publish and deploy the mobile application for consumption by consumer module 110. If the output of the test is successful, the mobile application is published in consumer module 110 in order for users to download and start using the mobile application. Consumer module 110 may correspond to an application sharing platform that users can access for viewing and downloading a mobile application. In an embodiment, the application sharing platform may correspond to a mobile application market such as Android or iOS.

Figure 2:
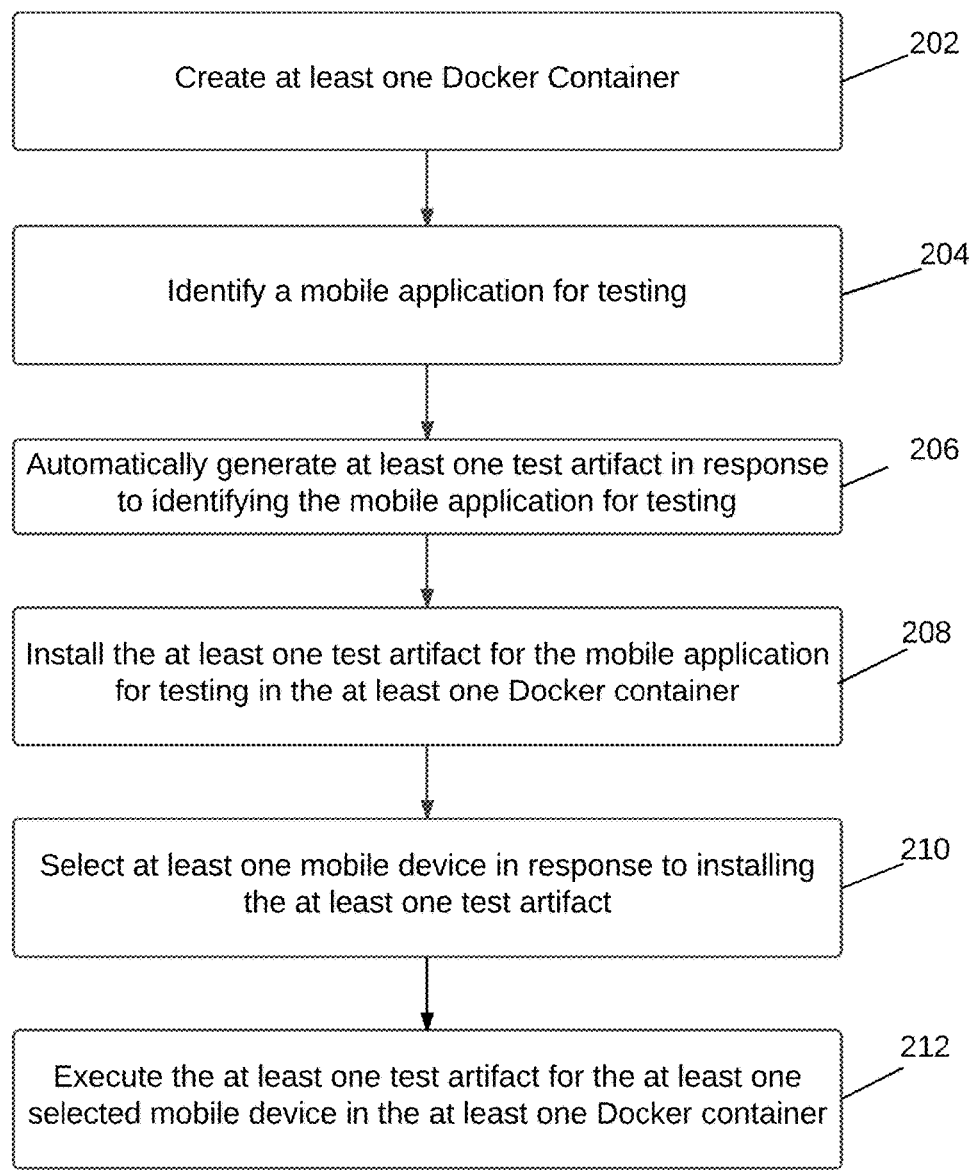
FIG. 2 illustrates a flowchart of a method for testing mobile applications, in accordance with an embodiment.

FIG. 2 illustrates a flowchart of a method for testing mobile applications, in accordance with an embodiment. As explained in conjunction with FIG. 1, developers may create a plurality of mobile applications for consumption by consumers. Before publishing and deploying the mobile applications, each mobile application needs to be tested and validated to ensure that the mobile application is free of errors and is compatible with different types of mobile devices existing in the market.

Thus, at step 202, one or more Docker containers may be created for facilitating the testing of mobile applications. Docker is an open platform technology for developers to build, ship, and run distributed applications. Essentially, Docker provides an interface and various databases to track conceptual objects, while leaving implementation primarily up to other lower-level technologies. In other words, Docker is a way of enclosing services in isolated environments called containers. A Docker container allows users to create multiple isolated and secure environments within a single instance of an operating system. Further, all required software testing tools and test artifacts are created inside the Docker container for facilitating the testing of mobile applications. Docker also converts or commits each container to a named image file and a user can use a plurality of such images in a layered approach. This layered approach for the creation of Docker images allows the reuse of existing Docker images without the need for rebuilding the entire OS file system. Instead, only the images that include the changed application itself are rebuilt.

The one or more Docker containers may be created using a Docker creator module. The Docker creator module is explained in detail with conjunction to FIG. 9. After creating the one or more Docker containers, a mobile application that needs to be tested is identified at step 204. The mobile application to be tested may be identified based on user stories and/or user requirements. In an embodiment, the user stories and the user requirements may be retrieved from one or more of a software tool and a user interface. This is further explained in detail in conjunction with FIG. 4.

Once the mobile application to be tested is identified one or more test artifacts are automatically generated at step 206. The one or more test artifacts are automatically generated based on the user stories and the user requirements. In Software Development Life Cycle (SDLC), an artifact usually refers to "things" that are produced by users involved in the testing process. Thus, the artifact may correspond to a product that is developed into different phases of software testing life cycle and shared with the stake holders. A sign off may be required on the artifacts from the appropriate stake-holders to ensure that there is no communication gap between customer and the test team. This is further explained in detail in conjunction with FIG. 5.

After automatically generating the one or more test artifacts, the one or more test artifacts are installed in the one or more Docker containers, at step 208, for testing the mobile application. The number of Docker containers in which the one or more test artifacts are installed may depend on the user stories, the user requirements, computing power associated with each Docker container, a cost function associated with the testing of the mobile application, and a time function associated with the mobile application. Thereafter, at step 210, one or more mobile devices are selected for which the mobile application needs to be tested. In an embodiment, the one or more mobile devices may be selected using a machine learning algorithm. In another embodiment, the one or more mobile devices may be selected based on inputs received from a user. The selection of one or more mobile devices is further explained in detail in conjunction with FIG. 6.

After selecting the one or more mobile devices, the one or more test artifacts for the one or more selected mobile devices are executed at step 212 in the one or more Docker containers. Before executing the one or more test artifacts, each container of the one or more containers is converted to an image file. Thereafter, the image file is detached from the shell so that the image file can be executed in different servers, laptops, and desktops. In an embodiment, the one or more test artifacts are executed in parallel across the one or more Docker containers using multi-threading concepts. The execution of the one or more test scripts may be initiated automatically using Continuous Integration (CI) tool. This is further explained in detail in conjunction with FIG. 7.

After the one or more test artifacts are executed, a test report may be generated. The test report includes information associated with the outcome of the execution of the one or more test artifacts. For example, the test report may include details about test artifacts that were executed successfully and the test artifacts that failed to execute successfully. This is further explained in detail in conjunction with FIG. 8.

Figure 3:
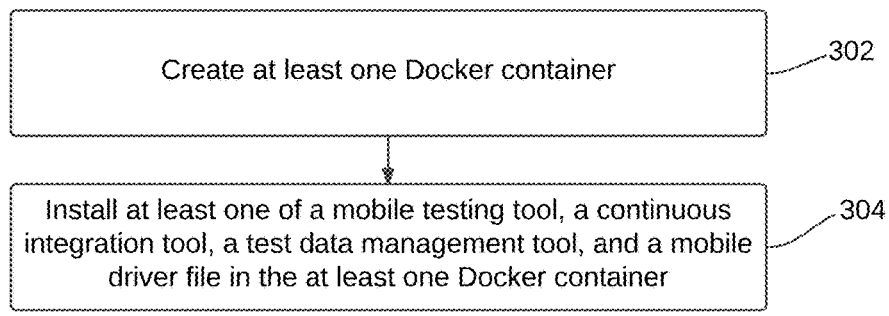
FIG. 3 illustrates a flowchart of a method for installing testing software in one or more docker containers, in accordance with an embodiment.

FIG. 3 illustrates a flowchart of a method for installing testing software in one or more Docker containers, in accordance with an embodiment. In order to enable testing of mobile applications, one or more Docker containers are created at step 302. Docker is an open platform for developers to build, ship, and run distributed applications. The one or more Docker containers are created using a Docker creator module. This is further explained in detail in conjunction with FIG. 9. A Docker container allows the developers to create multiple isolated and secure environments within a single instance of an operating system. Further, a container can be packaged with necessary libraries and dependencies that are required for running a service. Thus, Docker technology essentially provides an interface and various databases to track conceptual objects, while leaving implementation primarily up to other lower level technologies.

Once the one or more Docker containers are created, all the necessary software testing tools may be created inside the containers. Thus, at step 304, one or more of a mobile testing tool, a Continuous Integration tool, a Test data management tool, and a mobile driver may be installed in the one or more Docker containers. The mobile testing tool is typically used for automating regression test cases either in functional or non-functional mobile test cases. The mobile testing tool also provides a comprehensive solution to organize test cases, execute tests, collect results, and coordinate testing efforts among mobile developers. Further, the mobile testing tool helps in conducting functional testing, laboratory testing, performance testing, memory leakage testing, interrupt testing, and usability testing.

The Continuous Integration tool installed in the one or more Docker containers is configured to check and evaluate code quality. A Continuous Integration tool is an integral part of an Agile software development setup that is used to stop code errors that may render software unusable. Thus, the Continuous Integration tool acts as a gatekeeper that helps keep a tab on code quality. Examples of the continuous integration tool include, but are not limited to Jenkins, Travis, and Buildbot.

The Test data management tool installed in the one or more Docker containers is configured to create, maintain, and provision test data needed to rigorously test evolving mobile applications. A Test data management tool uniquely combines elements of data sub setting, masking and synthetic, on demand data generated to enable testing teams to meet the agile needs of an organization. As every test environment has its own set of complexities, test data is generally created before the test execution begins. Examples of Test data management include, but are not limited to CA DataMaker, HP Test Data Management, and IBM Infosphere.

The mobile driver installed in the one or more Docker containers may be selected based on the target environment, user stories, user requirement, and type of mobile device for which the testing needs to be performed. The mobile driver is installed to ensure compatibility between the one or more Docker containers and the mobile device for which the testing needs to be performed. After installing the one or more of the mobile testing tool, the continuous integration tool, the test data management tool, and the mobile driver in the one or more Docker containers, one or more folders may be created to maintain good standards for testing. For example, the one or more folders may correspond to folders such as "Configuration Files", "Test Scripts", "Test Data", "Object Repository", and "Test Results". Based on type of the one or more test artifacts, test content will be stored in appropriate folder of the one or more folders. For example, test scripts will be stored in "Test Scripts" folder and test data will be stored in "Test Data" folder.

Figure 4:
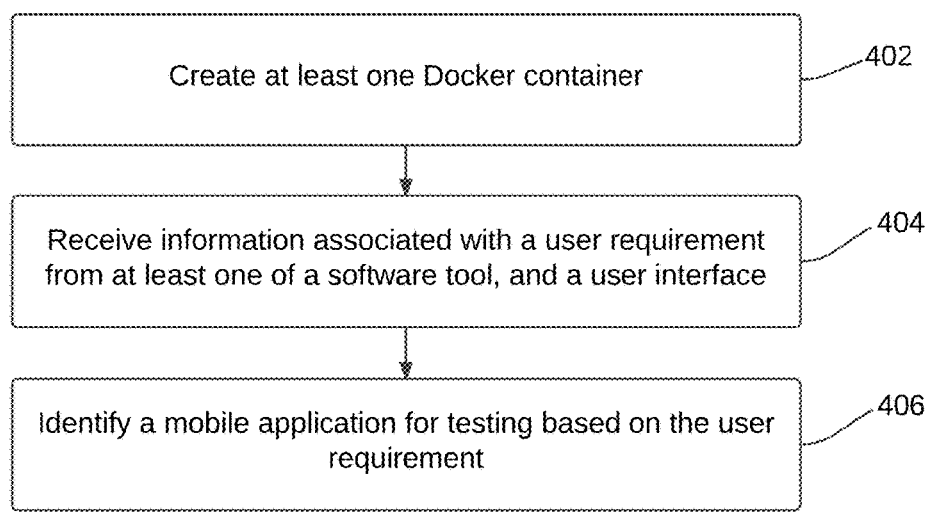
FIG. 4 illustrates a flowchart of a method for identifying a mobile application for testing, in accordance with an embodiment.

FIG. 4 illustrates a flowchart of a method for identifying a mobile application for testing, in accordance with an embodiment. Initially, at step 402, one or more Docker containers are created. Thereafter, at step 404, information associated with a user requirement is received. The user requirement information may be received from one or more of a software tool, and a user interface. For example, in an embodiment, the software tool may correspond to a mobile application identifier module. The mobile application identifier module may identify a mobile application for testing based on user requirement and based on user stories. The user requirement and the user stories may be driven by organizational needs and development stage associated with the mobile application. For example, AudiConnect, a mobile application which interacts with vehicles such as cars, may be selected by the mobile application identifier module based on the organizational needs. In the same manner, myBMW, another mobile application which interacts with vehicles may be selected by the mobile application identifier module based on the development stage of the myBMW application.

In another embodiment, the user requirement information may be received using the user interface. A user may submit any mobile application for testing based on user stories through the user interface. In an embodiment, the mobile application identifier module may be configured to operate as the user interface. After receiving the user requirement information, a mobile application is identified for testing at step 406. The mobile application is identified from the list of mobile applications for which user requirement information is received through the software tool and/or through the user interface. It will be evident to a person skilled in the art that receiving of user requirement information and subsequent identification of a mobile application for testing may be performed serially or concurrently. Further, the receiving of user requirement information and subsequent identification of the mobile application for testing may be performed by a common computing module. This is further explained in detail in conjunction with FIG. 9.

Figure 5:
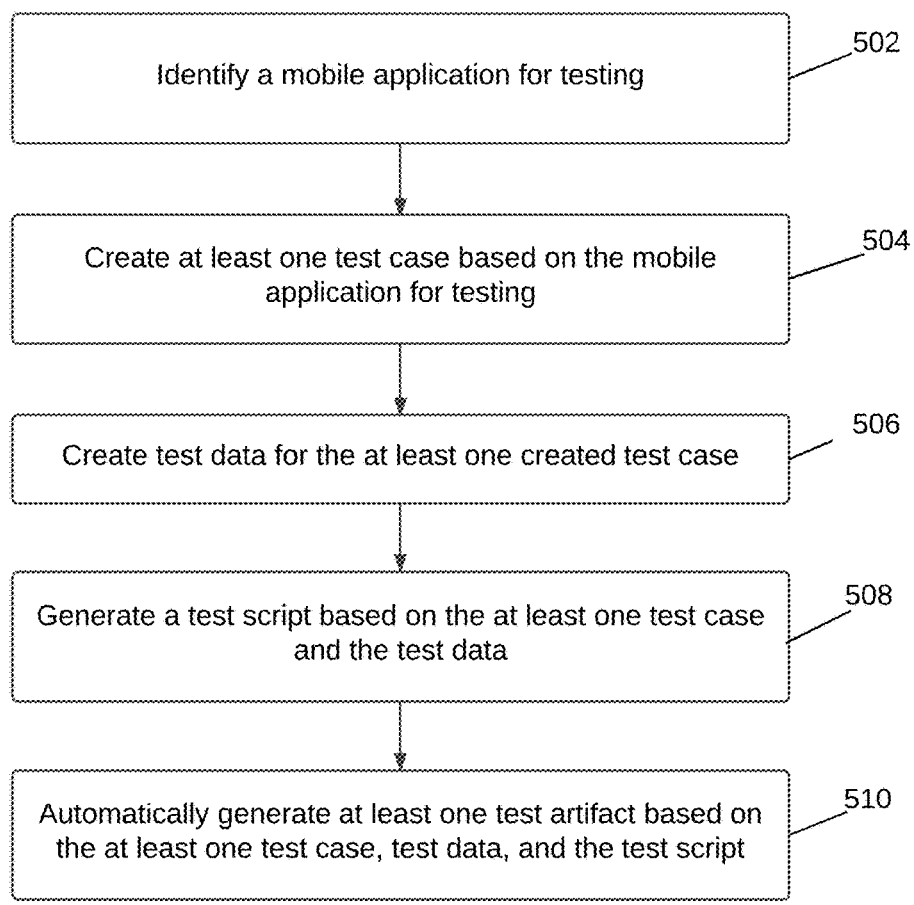
FIG. 5 illustrates a flowchart of a method for automatically generating one or more test artifacts, in accordance with an embodiment.

FIG. 5 illustrates a flowchart of a method for automatically generating one or more test artifacts, in accordance with an embodiment. At step 502, a mobile application is identified for testing. This has already been explained in conjunction with FIG. 4. After identifying the mobile application for testing, at step 504, one or more test cases are created automatically. A test case is a set of conditions under which a tester will determine whether an application, software system, or any of its features is working as it was originally designed to do so. The one or more test cases are created automatically based on user requirement information and user stories. A user story typically includes information associated with product owner, product document, and product specifications. The user requirement information and the user stories are parsed to generate one or more test conditions. The parsing is done based on keywords such as login, actual, expected, etc. Thereafter, the one or more test conditions are converted into the one or more test cases.

After creating the one or more test cases, at step 506, test data is created for each test case of the one or more test cases. The test data corresponds to input given to a mobile application which is under testing. Thus, test data represents data that affects or is affected by the execution of a specific module in the mobile application under testing. The test data is created by using data mining functionalities to quickly identify, match and link data to the one or more test cases from multiple sources. In an embodiment, a test data mart may be created for facilitating creation of the one or more test cases. The test data mart is a collection of summary tables built up from core attributes identified in test criteria present in the one or more test cases. Further, a Test Case Data Criteria (TCDC) may be configured in the test data mart. The TCDC is a logical table stored inside the test data mart and contains one row per test case of the one or more test cases. Each row defines one or more query criteria that defines data requirement of the one or more test cases for a given test data entity. Further, information such as whether each test case requires an exclusive or a shared lock on the matched test data entity instance is also specified in each row.

Thereafter, at step 508, a test script is generated based on the one or more test cases and the test data that is created. The test script is a set of instructions that will be performed on the system under test to test whether the mobile application under testing is performing as expected. In an embodiment, the test script may be generated manually by a user after receiving inputs associated with the one or more test cases and the test data. In another embodiment, the test script may be automatically generated based on the one or more test cases and the test data. This is further explained in detail in conjunction with FIG. 9. Finally, at step 510, one or more test artifacts are automatically generated by bundling together the one or more test cases, the test data, and the test script in one package or build.

Figure 6:
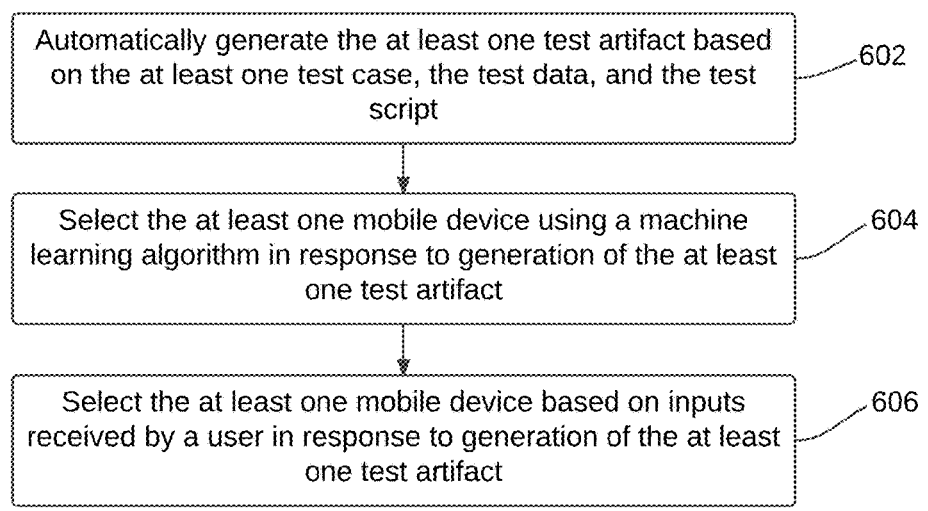
FIG. 6 illustrates a flowchart of a method for selecting one or more mobile devices for testing, in accordance with an embodiment.

FIG. 6 illustrates a flowchart of a method for selecting one or more mobile devices for testing, in accordance with an embodiment. After creating the one or more test cases, the test data, and the test script, one or more test artifacts are automatically generated at step 602. This has already been explained in detail in conjunction with FIG. 5. Thereafter, at step 604, a machine learning algorithm is employed for selecting the one or more mobile devices for testing. For example, in an embodiment, a decision tree algorithm may be used for selecting the one or more mobile devices for testing. The decision tree algorithm uses a decision tree as a predictive model, which maps observation about an item to conclusions about the item's target value. In a decision tree, each node is represented as a device and a pruning step is applied on each node in the tree. Pruning is a technique in machine learning that reduces the size of the decision tree by removing sections of the tree that provide little power to classify instances. Thus, pruning reduces the complexity of the final classifier and thereby improves the prediction accuracy. The decision tree algorithm stops removing nodes when no further selection can be made.

Alternatively, at step 606, the one or more mobile devices may be selected based on inputs received by a user. The user may input the one or more mobile devices for which the mobile application needs to be tested either manually or based on recommendations obtained by execution of the machine learning algorithm. In an embodiment, the user may simply confirm the recommendations received based on execution of the machine learning algorithm. In another embodiment, the one or more mobile devices may be selected purely based on the inputs received from the user and eliminating the execution of the machine learning algorithm. It will be evident to a person skilled in the art that the one or more mobile devices may be selected based on combination of inputs from user, execution of the machine learning algorithm, and execution of any other algorithm that can be configured to appropriately select a mobile device from a given list.

Figure 7:
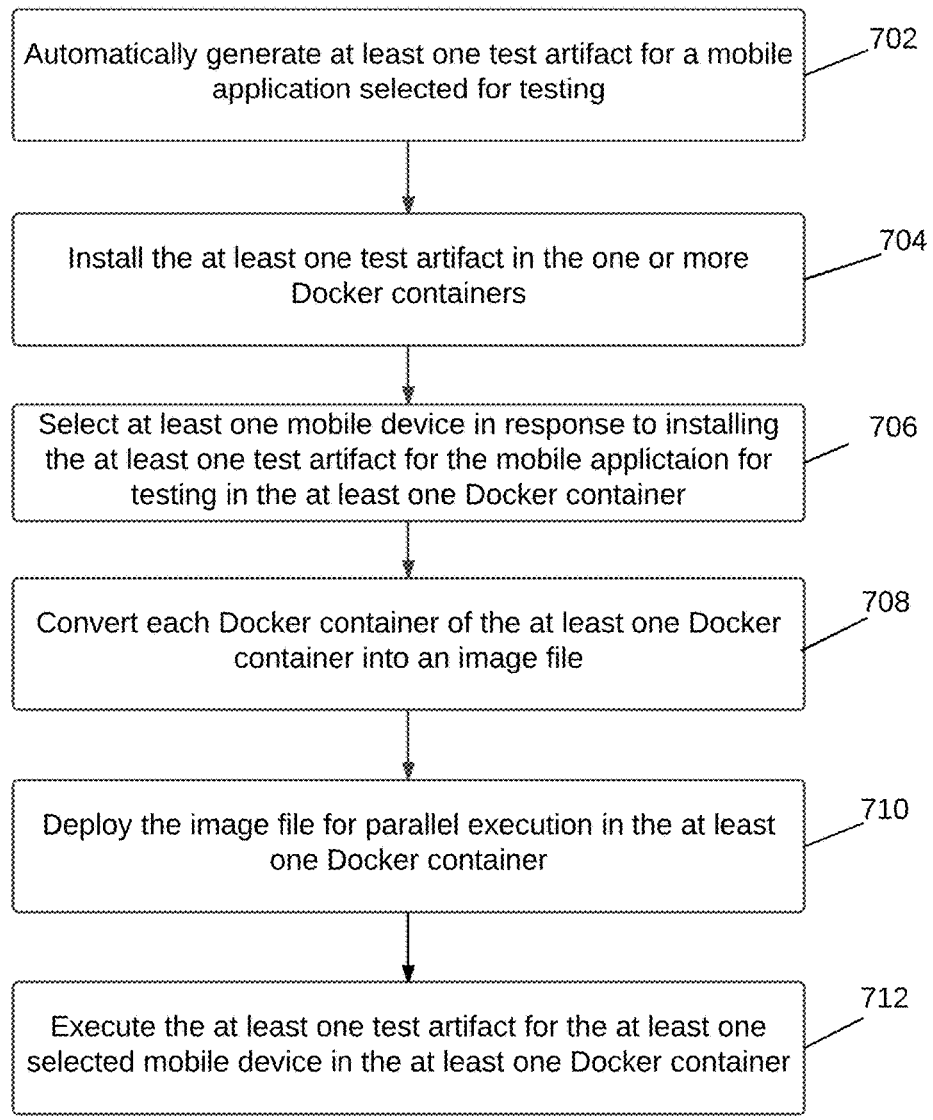
FIG. 7 illustrates a flowchart of a method for executing one or more test artifacts, in accordance with an embodiment.

FIG. 7 illustrates a flowchart of a method for executing one or more test artifacts, in accordance with an embodiment. At step 702, the one or more test artifacts are automatically generated based on the one or more test cases, the test data, and the test script. Thereafter, at step 704, the one or more test artifacts are installed in the one or more Docker containers for testing the mobile application. This has already been explained in conjunction with FIG. 2. Once the one or more test artifacts are installed, the one or more mobile devices are selected at step 706, for which the mobile application needs to be tested. After selecting the one or more mobile devices, at step 708, each Docker container of the one or more Docker containers are converted into an image file. Thereafter, the image file is detached from the shell so that the image file can be used for multiple executions in different server, laptops, and desktops.

After conversion, at step 710, the image file is deployed for parallel execution in the one or more Docker containers. In an embodiment, the image file may be initially deployed in a test server. Once the image file is deployed to the test server, startup time for each Docker container is greatly reduced and the performance of the processes running inside is the same as if the processes were running natively. Thus, the execution time of setting up and tearing down the one or more test artifacts is greatly reduced. After the image file is deployed, the one or more test artifacts are concurrently executed in the one or more Docker containers at step 712, for the one or more mobile devices that are selected. As a result, a test artifact created for one mobile device can be used for another mobile device having a different operating system. Thus, all the tests can be run in parallel irrespective of which operating system is associated with a specific mobile device of the one or more mobile devices that are selected. For example, a script developed in Android device may be used either in different types of Android devices or iOS devices. By way of another example, a first thread will be running on Android, a second thread will be running on iOS, and a third thread will be running on Blackberry.

Figure 8:
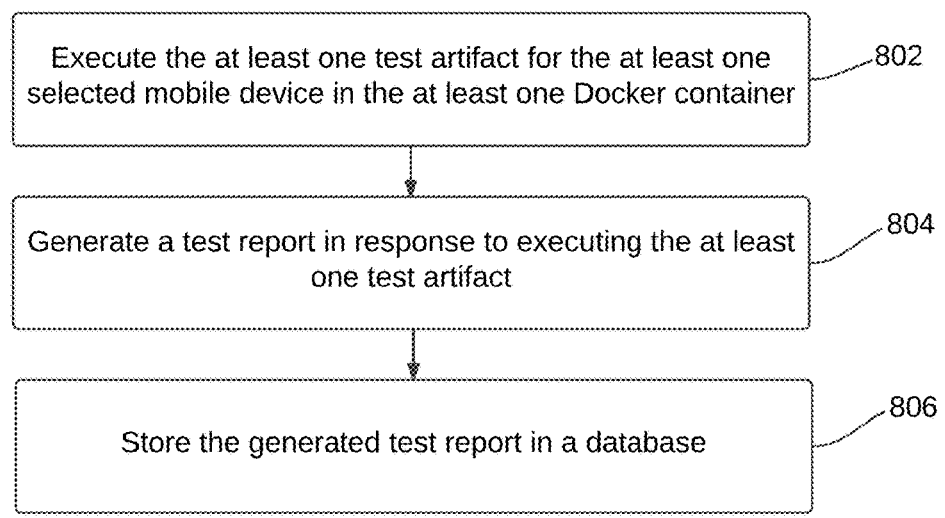
FIG. 8 illustrates a flowchart of a method for storing a test report in a database, in accordance with an embodiment.

FIG. 8 illustrates a flowchart of a method for storing a test report in a database, in accordance with an embodiment. At step 802, the one or more test artifacts are executed for the one or more mobile devices that have been selected. This has already been explained in conjunction with FIG. 7. After executing the one or more test artifacts, a test report is generated at step 804. The test report includes detail of the outcome of the execution of the one or more test artifacts. In an embodiment, the test report may correspond to a report generated using HTML technology. In another embodiment, the test report may correspond to a report generated using Excel technology. It will be evident to a person skilled in the art that the test report may be generated using any other technology. The test report may be generated either during the execution of the one or more test artifacts or may be generated after execution of the one or more test artifacts. The test report may be divided into multiple sections to represent different kinds of information pertaining to the execution of the one or more test artifacts. For example, a section may include only summary information whereas another section may include detailed information. In an embodiment, if any test artifact of the one or more test artifacts fails due to unexpected error in application, then a screen shot of the application where it failed may be captured for inclusion in the test report. Further, error links may be printed out and presented to the user based on severity of an issue. For example, if there is an error which is 100% different from an expected result, then such an error may be considered as of high severity and highlighted to the user.

Thereafter, at step 806, the generated test report is stored in a database. In an embodiment, the test report may be stored for review by the user. Similarly, the test report may be stored for further analysis by the user or for archival purpose. In an embodiment, the generated test report may be customized by the user before storing the test report in the database. The user may add, modify, or delete content from the generated test report before storing the test report in the database.

Figure 9:
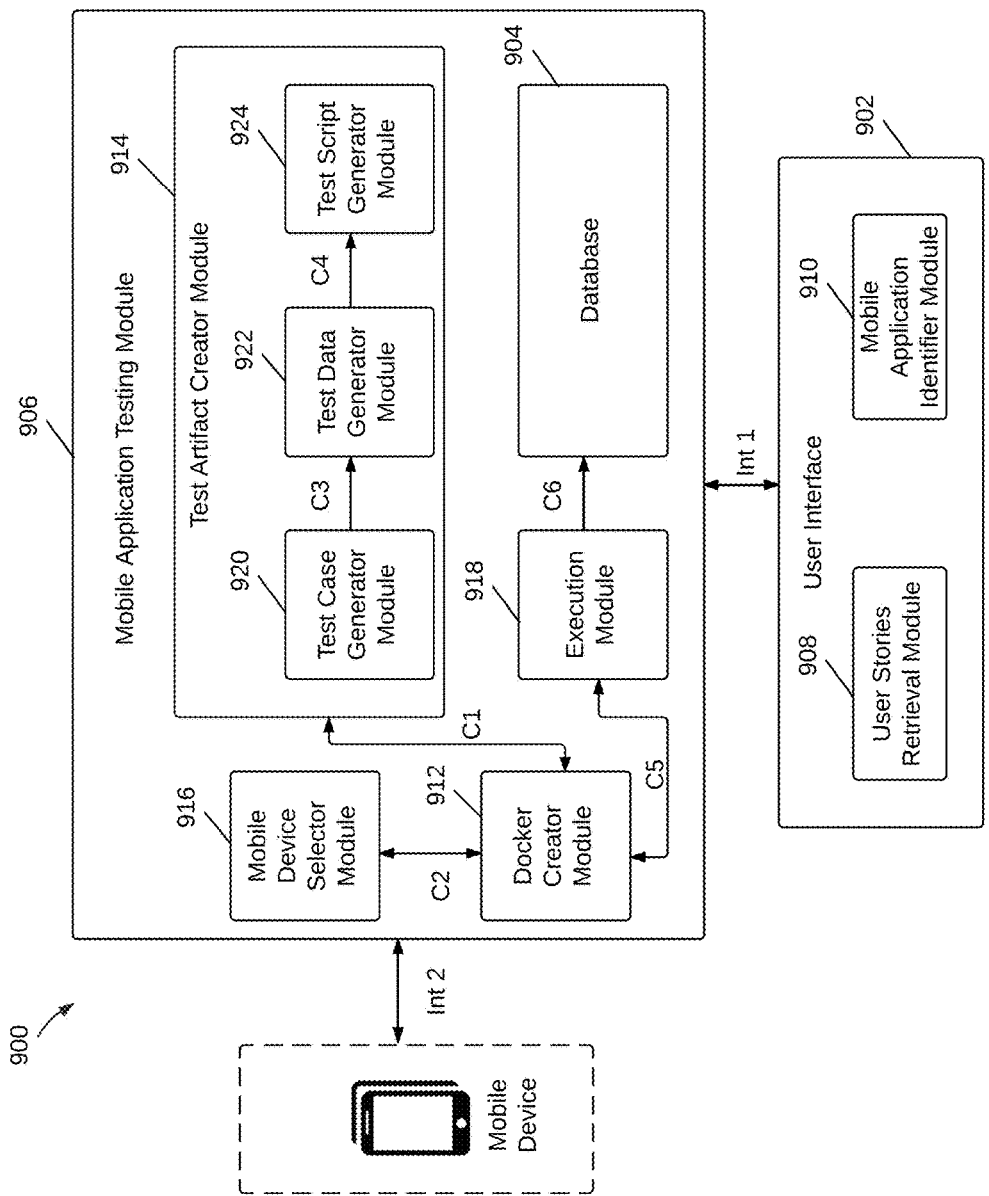
FIG. 9 illustrates a mobile application testing system, in accordance with an embodiment.

FIG. 9 illustrates a mobile application testing system or computing device 900, in accordance with an embodiment. Mobile application testing system 900 includes a user interface 902, a database 904, and a mobile application testing module 906. Developers/users who create mobile applications require the mobile applications to be tested and validated so as to ensure that there are no errors present in the mobile applications and that the mobile applications are compatible with different types of mobile devices existing in the market. To that end, user interface 902 is configured to allow a developer to input information about mobile applications that the developer wants to be tested. In an embodiment, user interface 902 may be front-end of a software tool that is configured to allow the developer to enter details of mobile applications. In another embodiment, user interface 902 may be a stand-alone Human-Machine Interface or an Operator Interface.

User interface 902 includes a user stories retrieval module 908, and a mobile application identifier module 910. User stories retrieval module 908 is configured to retrieve all relevant user stories from a product catalog. Based on prioritization, a user story may be selected for each and every sprint life cycle. A user story is a tool that is used to describe the type of users, user requirements, and capture a description of a software feature from an end-user perspective. Therefore, based on the user stories and the user requirements, the developers create the mobile applications. Once the mobile applications have been developed, they need to be tested and integrated into an evolving product or system. Thus, the developer may access mobile application identifier module 910 to select a mobile application for testing and integration.

Information associated with the selected mobile application for testing is sent from User Interface 902 to mobile application testing module 906. Mobile application testing module 906 includes a Docker creator module 912, a test artifact creator module 914, a mobile device selector module 916, and an execution engine 918. Docker creator module 912 is configured to create one or more Docker containers for facilitating testing of mobile applications. Docker is an open platform for developers to build, ship, and run distributed applications. In other words, Docker is a way of enclosing services in isolated environments called containers. A Docker container allows users to create multiple isolated and secure environments within a single instance of an operating system. Further, all required software testing tools and test artifacts are created inside the Docker container. Essentially, Docker provides an interface and various databases to track conceptual objects, while leaving implementation primarily up to other lower-level technologies. Docker uses images and a user can use a plurality of images in a layered approach. This layered approach for the creation of Docker images allows the reuse of existing Docker images without the need for rebuilding the entire OS file system. Instead, only the images that include the changed application itself are rebuilt.

After creating the one or more Docker containers, in order to enable testing of mobile applications, Docker creator module 912 installs necessary software testing tools inside each Docker container of the one or more Docker containers. Thus, Docker creator module 912 installs one or more of a mobile testing tool, a Continuous Integration tool, a Test data management tool, and a mobile driver for enabling testing of the mobile applications. The mobile testing tool is typically used for automating regression test cases either in functional or non-functional mobile test cases. The mobile testing tool also provides a comprehensive solution to organize test cases, execute tests, collect results, and coordinate testing efforts among mobile developers. Further, the mobile testing tool helps in conducting functional testing, laboratory testing, performance testing, memory leakage testing, interrupt testing, and usability testing.

The Continuous Integration tool installed in the one or more Docker containers to check and evaluate code quality. A Continuous Integration tool is an integral part of an Agile software development setup that is used to stop code errors that may render software unusable. Thus, the Continuous Integration tool acts as a gatekeeper that helps keep a tab on code quality. Examples of the continuous integration tool include, but are not limited to Jenkins, Travis, and Buildbot.

The test data management tool are installed in the one or more Docker containers to create, maintain, and provision test data needed to rigorously test evolving mobile applications. A test data management tool uniquely combines elements of data sub setting, masking and synthetic, on demand data generated to enable testing teams to meet the agile needs of an organization. As every test environment has its own set of complexities, test data is generally created before the test execution begins. Examples of test data management tool include, but are not limited to CA Data-Maker, HP Test Data Management, and IBM Infosphere.

The mobile driver installed in the one or more Docker containers may be selected based on the target environment, user stories, user requirement, and type of mobile device for which the testing needs to be performed. The mobile driver is installed to ensure compatibility between the one or more Docker containers and the mobile device for which the testing needs to be performed. After installing the one or more of the mobile testing tool, the Continuous Integration tool, the test data management tool, and the mobile driver, Docker creator module 912 may create one or more folders to maintain good standards for testing. Thus, the one or more folders may correspond to folders such as "Configuration Files", "Test Scripts", "Test Data", "Object Repository", and "Test Results". Based on type of the one or more test artifacts, test content will be stored in appropriate folder of the one or more folders. For example, test scripts will be stored in "Test Scripts" folder and test data will be stored in "Test Data" folder.

Thereafter, Docker creator module 912 identifies and fetches a mobile application for testing from User Interface 902. Docker creator module 912 and User Interface 902 are operatively coupled using Interface 1 as shown in FIG. 9. Interface 1 is configured to allow User Interface 902 to send appropriate information to Docker creator module 912. As has been explained before, the mobile application for testing may be identified and selected based on user stories and user requirements.

Docker creator module 912 is operatively coupled to Test artifact creator module 914 using Connector 1 as shown in FIG. 9. Connector 1 is configured to allow Docker creator module 912 and test artifact module 914 to exchange appropriate information with each other. Test artifact creator module 914 is configured to generate one or more test artifacts based on the mobile application identified for testing and in response to creation of the one or more Docker containers. In Software Development Life Cycle (SDLC), an artifact usually refers to "things" that are produced by users involved in the testing process. Thus, the artifact may correspond to a product that is developed into different phases of software testing life cycle and shared with the stake holders. A sign off may be required on the artifacts from the stake-holders to ensure that there is no communication gap between customer and the test team. Test artifact creator module 914 includes a test case generator module 920, a test data generator module 922, and a Test Script Generator Module 924 to facilitate generation of the one or more test artifacts. Initially, test case generator module 920 automatically creates one or more test cases after receiving information associated with the identified mobile application for testing and the one or more Docker containers that have been created. A test case is a set of conditions under which a tester will determine whether an application, software system, or any of its features is working as it was originally designed to do so. In order to create the one or more test cases, test case generator module 920 parses the user stories and the user requirements information received from User Interface 902. The user stories and the user requirements information are parsed to generate one or more test conditions. Test case generator module 920 parses the information based on keywords such as login, actual, expected, etc to generate the one or more test conditions. Thereafter, the one or more test conditions are converted into the one or more test cases by test case generator module 920.

Thereafter, test case generator module 920 transfers information associated with the one or more test cases to test data generator module 922. Test case generator module 920 is operatively coupled to test data generator module 922 using Connector 3. Connector 3 is configured to be used by test case generator module 920 for exchanging information that is required by test data generator module 922 for generating test data. Connector 3 may be implemented as Remote Procedure Call (RPC), Application Programming Interface (API), Socket, or any other mechanism. Test data generator module 922 is configured to create test data for each test case of the one or more test cases. The test data corresponds to input given to a mobile application which is under testing. Thus, test data represents data that affects or is affected by the execution of a specific module in the mobile application under testing. Test data generator module 922 creates the test data by employing data mining functionalities. Using data mining functionalities, test data generator module 922 is able to quickly identify, match and link data to the one or more test cases from multiple sources. In an embodiment, test data generator module 922 may also create a test data mart for facilitating creation of the one or more test cases. The test data mart is a collection of summary tables built up from core attributes identified in test criteria present in the one or more test cases. Further, test data generator module 922 may also configure a Test Case Data Criteria (TCDC) in the test data mart. The TCDC is a logical table stored inside the test data mart and contains one row per test case of the one or more test cases. Each row defines one or more query criteria that defines data requirement of the one or more test cases for a given test data entity. Further, information such as whether each test case requires an exclusive or a shared lock on the matched test data entity instance is also specified in each row.

After creating the test data, test data generator module 922 transfers the test data information to test script generator module 924. Test data generator module 922 is operatively coupled with test script generator module 924 using Connector 4. Connector 4 is configured to be used by test data generator module 922 to share information with test script generator module 924 that is required for generating test scripts. Connector 4 may be implemented as RPC, API, Socket, or any other mechanism. Test script generator module 924 is configured to automatically generate a test script based on the one or more test cases and the test data that has been created. The test script is a set of instructions that will be performed on the system under test to test whether the mobile application under testing is performing as expected. In an embodiment, the test script may be generated manually by a user after receiving inputs associated with the one or more test cases and the test data using Test script generator module 924. Once the test script is generated, test artifact creator module 914 automatically bundles together the one or more test cases, the test data, and the test script in one package or builds to generate the one or more test artifacts.

Thereafter, test artifact creator module 914 sends information associated with the package or builds back to Docker creator module 912 for installation of the one or more test cases, the test data and the test script in the one or more Docker containers. The number of Docker container in which the one or more test artifacts are installed may depend on the user stories, the user requirements, computing power associated with each Docker container, a cost function associated with the testing of the mobile application, and a time function associated with the mobile application.

Once the one or more test artifacts are installed in the one or more Docker containers by Docker creator module 912, mobile device selector module 916 selects one or more mobile devices for which the mobile application needs to be tested. Information about the one or more mobile devices is retrieved by mobile device selector module 916 over Interface 2 as shown in FIG. 9. Interface 2 is configured to allow mobile device selector module 916 for accessing information about the one or more mobile devices that are connected to mobile application testing system 900. Interface 2 may be implemented as RPC, API, Socket, or any other mechanism. Thereafter, mobile device selector module 916 transfers the information associated with the one or more mobile devices that have been selected to Docker creator module 912 using Connector 2 as shown in FIG. 9. Connector 2 is configured to allow exchange of information between device selector module 916 and Docker creator module 912 and may be based on RPC, API, Socket or any other mechanisms. Mobile device selector module 916 may use a machine learning algorithm for selecting the one or more mobile devices.

For example, in an embodiment, a decision tree algorithm may be used by mobile device selector module 916 for selecting the one or more mobile devices for testing. The decision tree algorithm uses a decision tree as a predictive model, which maps observation about an item to conclusions about the item's target value. In a decision tree, each node is represented as a device and a pruning step is applied on each node in the tree. Pruning is a technique in machine learning that reduces the size of the decision tree by removing sections of the tree that provide little power to classify instances. Thus, pruning reduces the complexity of the final classifier and thereby improves the prediction accuracy. The decision tree algorithm stops removing nodes when no further selection can be made. Alternatively, the user may manually select the one or more mobile devices by inputting information associated with the one or more mobile devices in mobile device selector module 916.

After the one or more mobile devices have been selected, execution engine 918 executes the one or more test artifacts for the one or more selected mobile devices in the one or more Docker containers. Execution engine 918 is operatively coupled to Docker creator module 912 using Connector 5 as shown in FIG. 9. Connector 9 is configured to be used by Docker creator module 912 for generating executable suites and for sending the information to execution engine 919. Connector may be implemented as RPC, API, Socket or any other mechanism. Before executing the one or more test artifacts, Docker creator module 912 converts each container of the one or more containers an image file. Thereafter, Docker creator module 912 detaches the image file from the shell so that the image file can be executed in different servers, laptops, and desktops by execution engine 918. In an embodiment, the one or more test artifacts are executed in parallel across the one or more Docker containers by execution engine 918 using multi-threading concepts. The execution of the one or more test scripts may be initiated automatically using Continuous Integration tool present in Docker creator module 912.

In another embodiment, image file may be initially deployed in a test server by execution engine 918. Once the image file is deployed to the test server, startup time for each Docker container is greatly reduced and the performance of the processes running inside is the same as if the processes were running natively. Thus, the execution time of setting up and tearing down the one or more test artifacts is greatly reduced. After the image file is deployed, execution engine 918 concurrently executes the one or more test artifacts in the one or more Docker containers for the one or more mobile devices that are selected. As a result, a test artifact created for one mobile device can be used for another mobile device in different operating system. Thus, all the tests can be run in parallel irrespective of which operating system is associated with a specific mobile device of the one or more mobile devices that are selected. For example, a script developed in Android device may be used either in different types of Android devices or iOS devices. By way of another example, a first thread will be running on Android, a second thread will be running on iOS, and a third thread will be running on Blackberry.

In an embodiment, execution engine 918 may generate a test report after the execution of the one or more test artifacts. The test report includes information associated with the outcome of the execution of the one or more test artifacts. For example, the test report may include details about test artifacts that were executed successfully and the test artifacts that failed to execute successfully. The test report may be generated by Execution Engine 918 either during the execution of the one or more test artifacts or may be generated after execution of the one or more test artifacts. The test report may be divided into multiple sections to represent different kinds of information pertaining to the execution of the one or more test artifacts. For example, a section may include only summary information whereas another section may include detailed information. In an embodiment, if any test artifact of the one or more test artifacts fails due to unexpected error in application, then a screen shot of the application where it failed may be captured by execution engine 918 for inclusion in the test report. Further, error links may be printed out and presented to the user by execution engine 918 based on severity of an issue. For example, if there is an error which is 100% different from an expected result, then such an error may be considered as of high severity and highlighted to the user.

After generating the test report, execution engine 918 may store the test report in database 904. Execution engine 918 is operatively coupled to database 904 using connector 6 as shown in FIG. 9. Connector 6 may be implemented as RPC, API, Socket, or any other mechanism. The test report may be stored in database 904 for review by the user. Similarly, the test report may be stored for further analysis by the user or for archival purpose. In an embodiment, the generated test report may be customized by the user before storing the test report in database 904. The user may add, modify, or delete content from the generated test report before storing the test report in database 904. Further, database 904 is also configured to store information associated with information generated or associated with each module present in mobile application testing system 900.

Figure 10:
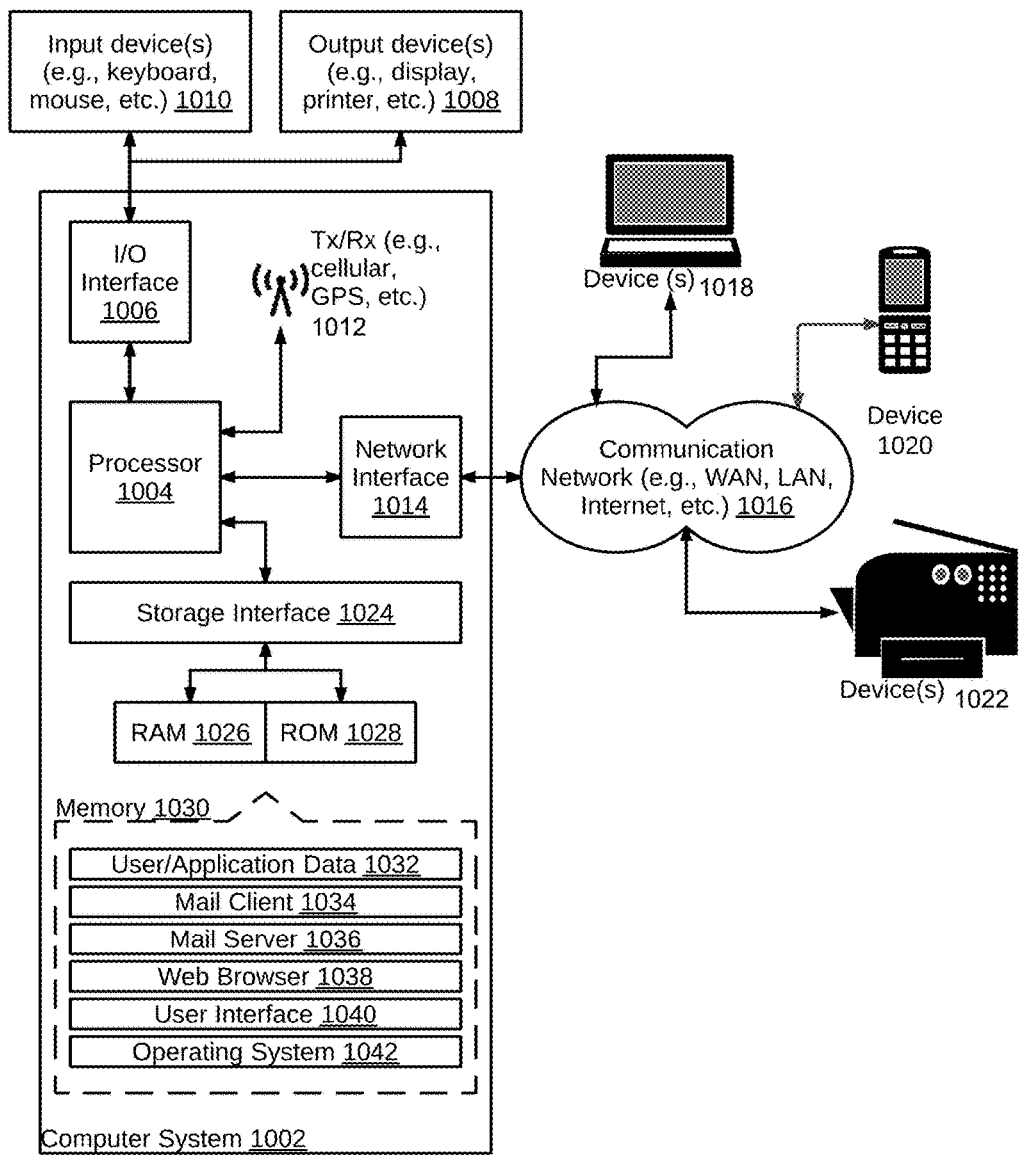
FIG. 10 illustrates a block diagram of an exemplary computer system for implementing various embodiments.

FIG. 10 illustrates a block diagram of an exemplary computer system 1002 for implementing various embodiments is disclosed. Computer system 1002 may comprise a central processing unit ("CPU" or "processor") 1004. Processor 1004 may comprise at least one data processor for executing program components for executing user- or system-generated requests. A user may include a person, a person using a device such as such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD Athlon, Duron or Opteron, ARM's application, embedded or secure processors, IBM PowerPC, Intel's Core, Itanium, Xeon, Celeron or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 1010 may be a printer, fax machine, video display (e.g., cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (e.g., Texas Instruments WiLink WL1283, Broadcom BCM4760IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (e.g., using Wireless Application Protocol), the Internet, etc. Using network interface 1016 and communication network 1014, computer system 1002 may communicate with devices 1018, 1020, and 1022. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 602 may itself embody one or more of these devices.

In some embodiments, processor 1004 may be disposed in communication with one or more memory devices (e.g., a RAM 1026, a ROM 1028, etc.) via a storage interface 1024. Storage interface 1024 may connect to memory devices 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 1030 may store a collection of program or database components, including, without limitation, an operating system 1032, a user interface application 1034, a web browser 1036, a mail server 1038, a mail client 1040, a user/application data 1042 (e.g., any data variables or data records discussed in this disclosure), etc. Operating system 1032 may facilitate resource management and operation of computer system 1002. Examples of operating system 1032 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 1034 may facilitate display, execution, interaction, manipulation, or operation of program components through textual or graphical facilities. For example, user interfaces may provide computer interaction interface elements on a display system operatively connected to computer system 1002, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 1002 may implement web browser 1036 stored program component. Web browser 1036 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 1002 may implement mail server 1038 stored program component. Mail server 1038 may be an Internet mail server such as Microsoft Exchange, or the like. Mail server 1038 may utilize facilities such as ASP, ActiveX, ANSI C++/C#, Microsoft .NET, CGI scripts, Java, JavaScript, PERL, PHP, Python, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement mail client 1040 stored program component. Mail client 1040 may be a mail viewing application, such as Apple Mail, Microsoft Entourage, Microsoft Outlook, Mozilla Thunderbird, etc.

In some embodiments, computer system 1002 may store user/application data 1042, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiment of the invention provide methods, system, and computer program products for testing mobile applications. The method provides a common, generic, and well-suited mobile test automation framework for testing mobile devices and mobile applications that run on such mobile devices. The mobile test automation framework allows mobile applications to be tested across multiple mobile operating systems by making use of Docker containers technology. The method reduces the time required for testing mobile applications by allowing parallel execution of test artifacts on multiple devices without any repetitions. Further, the method simplifies and speeds up testing of mobile application by making use of reusability during generation of test artifacts. The method also increases the mobile software quality and usability as well as enhances integration with different computing environments.

The specification has described systems and methods for testing mobile applications in a mobile application testing system. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for testing mobile applications implemented by a mobile application testing computing device, the method comprising:
creating at least one Docker container in the mobile application testing computing device;
identifying a mobile application for testing;
automatically generating at least one test artifact in response to identifying the mobile application for testing, wherein the test artifact comprises one or more test conditions;
installing the at least one test artifact for testing in the at least one Docker container;
selecting at least one mobile device in response to installing the at least one test artefact based on a decision tree algorithm that comprises a decision tree having a plurality of nodes, wherein at least a node of the decision tree is indicative of a mobile device or an observation corresponding to a mobile device, and the observation is derived based on the one or more test conditions, and a pruning of the nodes is performed on each node of the decision tree to select one or more nodes of the decision tree that assist in classification of instances leading to the selection; and
executing the at least one test artifact for the at least one selected mobile device in the at least one Docker container.

2. The method of claim 1 further comprising installing at least one of a mobile testing tool, a continuous integration tool, a test data management tool, or a mobile driver file in the at least one Docker container.

3. The method of claim 1, further comprising:
creating at least one test case based on the mobile application;
creating test data for the at least one created test case; and
generating a test script based on the at least one test case and the test data.

4. The method of claim 1, further comprising selecting the at least one mobile device based on an input received from a user device.

5. The method of claim 1, further comprising:
converting the at least one Docker container into an image file; and
deploying the image file for parallel execution in the at least one Docker container.

6. The method of claim 1 further comprising generating a test report in response to executing the at least one test artifact for the at least one selected mobile device in the at least one Docker container, wherein the test report comprises information associated with outcome of the execution of the at least one test artifact.

7. A mobile application testing computing device comprising a memory comprising programmed instructions stored thereon and one or more processors coupled to the memory and configured to be capable of executing the stored programmed instructions to:
create at least one Docker container in the mobile application testing computing device;
identify a mobile application for testing;
automatically generate at least one test artifact in response to identifying the mobile application for testing, wherein the test artifact comprises one or more test conditions;

install the at least one test artifact for testing in the at least one Docker container;
select at least one mobile device in response to installing the at least one test artefact based on a decision tree algorithm that comprises a decision tree having a plurality of nodes, wherein at least a node of the decision tree is indicative of a mobile device or an observation corresponding to a mobile device, the observation is derived based on the one or more test conditions, and a pruning of the nodes is performed on each node of the decision tree to select one or more nodes of the decision tree that assist in classification of instances leading to the selection; and
execute the at least one test artifact for the at least one selected mobile device in the at least one Docker container.

8. The mobile application testing computing device of claim 7, wherein the one or more processors are further configured to be capable of executing the stored programmed instructions to install at least one of a mobile testing tool, a continuous integration tool, a test data management tool, or a mobile driver file in the at least one Docker container.

9. The mobile application testing computing device of claim 7, wherein the one or more processors are further configured to be capable of executing the stored programmed instructions to:
create at least one test case based on the mobile application;
create test data for the at least one created test case; and
generate a test script based on the at least one test case and the test data.

10. The mobile application testing computing device of claim 7, wherein the one or more processors are further configured to be capable of executing the stored programmed instructions to select the at least one mobile device based on an input received from a user device.

11. The mobile application testing computing device of claim 7, wherein the one or more processors are further configured to be capable of executing the stored programmed instructions to:
convert the at least one Docker container into an image file; and
deploy the image file for parallel execution in the at least one Docker container.

12. The mobile application testing computing device of claim 7, wherein the one or more processors are further configured to be capable of executing the stored programmed instructions to generate a test report in response to executing the at least one test artifact for the at least one selected mobile device in the at least one Docker container, wherein the test report comprises information associated with outcome of the execution of the at least one test artifact.

13. A non-transitory computer readable medium comprising programmed instructions stored thereon for testing mobile applications that when executed by one or more processors cause the one or more processors to:
create at least one Docker container in a mobile application testing computing device;
identify a mobile application for testing;
automatically generate at least one test artifact in response to identifying the mobile application for testing; install the at least one test artifact for testing in the at least one Docker container, wherein the test artifact comprises one or more test conditions;
select at least one mobile device in response to installing the at least one test artefact based on a decision tree algorithm that comprises a decision tree having a plurality of nodes, at least a node of the decision tree is indicative of a mobile device or an observation corresponding to a mobile device, and the observation is derived based on the one or more test conditions, and a pruning of the nodes is performed on each node of the decision tree to select one or more nodes of the decision tree that assist in classification of instances leading to the selection; and
execute the at least one test artifact for the at least one selected mobile device in the at least one Docker container.

14. The non-transitory computer readable medium of claim 13, wherein the programmed instructions, when executed by the one or more processors, further cause the one or more processors to install at least one of a mobile testing tool, a continuous integration tool, a test data management tool, or a mobile driver file in the at least one Docker container.

15. The non-transitory computer readable medium of claim 13, wherein the programmed instructions, when executed by the one or more processors, further cause the one or more processors to:
create at least one test case based on the mobile application;
create test data for the at least one created test case; and
generate a test script based on the at least one test case and the test data.

16. The non-transitory computer readable medium of claim 13, wherein the programmed instructions, when executed by the one or more processors, further cause the one or more processors to select the at least one mobile device based on an input received from a user device.

17. The non-transitory computer readable medium of claim 13, wherein the programmed instructions, when executed by the one or more processors, further cause the one or more processors to:
convert the at least one Docker container into an image file; and
deploy the image file for parallel execution in the at least one Docker container.

18. The non-transitory computer readable medium of claim 13, wherein the programmed instructions, when executed by the one or more processors, further cause the one or more processors to generate a test report in response to executing the at least one test artifact for the at least one selected mobile device in the at least one Docker container, wherein the test report comprises information associated with outcome of the execution of the at least one test artifact.

19. The method of claim 1, wherein a count of the generated Docker container is based on at least one or more user stories for generating the test artifacts, one or more user requirements for generating the test artifacts, computing power associated with each Docker container, a cost function associated with the testing of the mobile application, and a time function associated with the mobile application.

* * * * *